US005391857A

United States Patent [19]
Pompey

[11] Patent Number: 5,391,857
[45] Date of Patent: Feb. 21, 1995

[54] WELDING TIP ROLLER GUIDE

[76] Inventor: Yvon A. Pompey, 632 Wilson St., Salinas, Calif. 93901

[21] Appl. No.: 126,959

[22] Filed: Sep. 22, 1993

[51] Int. Cl.$^6$ ............................................. B23K 9/12
[52] U.S. Cl. .............................. 219/124.31; 219/136; 228/45
[58] Field of Search .................... 219/124.31, 136; 228/25, 32, 45

[56] References Cited

U.S. PATENT DOCUMENTS

| | | | |
|---|---|---|---|
| 2,065,467 | 12/1936 | Hutchison | 219/124.31 |
| 3,201,561 | 8/1965 | Damon | 219/124.31 |
| 3,573,425 | 4/1971 | Damon | 219/124.31 |
| 3,581,049 | 5/1971 | Creith | 219/124.31 |
| 4,263,497 | 4/1981 | Cozzini | 219/124.31 |
| 4,328,412 | 5/1982 | Watanabe et al. | 219/124.31 |

FOREIGN PATENT DOCUMENTS 158993 2/1983 Germany .................... 219/124.31

*Primary Examiner*—Clifford C. Shaw
*Attorney, Agent, or Firm*—Hugh E. Smith

[57] ABSTRACT

A welding tip roller guide for supporting a welding tip at a predetermined distance from a corner or other area of a work piece. The guide includes a pair of wheels which allow the device to travel along a corner formed by two adjoining materials. The guide further includes an integral height adjustment mechanism and a pair of guide wheels both to facilitate quick height adjustment of the welding tip and to provide improved lateral stability, respectively.

2 Claims, 4 Drawing Sheets

WELDING TIP ROLLER GUIDE

BACKGROUND OF THE INVENTION

1. Field of the Invention

The present invention relates to welding devices and more particularly pertains to welding tip roller guides which may be utilized for supporting a welding tip at a predetermined distance from a corner or other area of a work piece.

2. Description of the Prior Art

The use of welding devices is known in the prior art. More specifically, welding devices heretofore devised and utilized for the purpose of guiding a welding tip are known to consist basically of familiar, expected and obvious structural configurations, notwithstanding the myriad of designs encompassed by the crowded prior art which have been developed for the fulfillment of countless objectives and requirements.

For example, an automatic corner welding adapter is illustrated in U.S. Pat. No. 4,745,259 which discloses a device to which may be attached plates to be welded along a common corner line edge and a welding torch driven by a lead screw such that the plates are fuse welded together beginning and ending at arbitrary preset locations.

A welding jig apparatus is described in U.S. Pat. No. 4,682,765 which may be utilized for holding bar stock work pieces in an intersecting and aligned relationship to form a metal grating structure. The apparatus includes a number of elongated radial cams located in a spaced apart relationship to each other and in two parallel rows on a work surface.

Another patent of interest is U.S. Pat. No. 4,752,350 which illustrates a device for making welded corner joints. The device may be used in the manufacture of welded corner joints between hollow plastic section shaped parts which abut against plastic sections during the heating-up and also during the welding process.

Other relevant patents include U.S. Pat. Nos. 4,027,868, and 4,041,270.

While these devices fulfill their respective, particular objectives and requirements, the aforementioned patents do not describe a welding tip roller guide which may be utilized for supporting a welding tip at a predetermined distance from a corner or other area of a work piece.

In this respect, the welding tip roller guide according to the present invention substantially departs from the conventional concepts and designs of the prior art, and in so doing provides an apparatus primarily developed for the purpose of supporting a welding tip at a predetermined distance from a corner formed by two adjoining materials to be welded together.

SUMMARY OF THE INVENTION

In view of the foregoing disadvantages inherent in the known types of welding devices now present in the prior art, the present invention provides a new welding tip roller guide construction wherein the same can be utilized for supporting a welding tip at a predetermined distance from a corner formed by two adjoining materials and allowing the welding tip to travel along such a corner to weld such adjoining materials together. As such, the general purpose of the present invention, which will be described subsequently in greater detail, is to provide a new welding tip roller guide apparatus which has many of the advantages of the welding devices mentioned heretofore and many novel features that result in a welding tip roller guide which is not anticipated, rendered obvious, suggested, or even implied by any of the prior art welding devices, either alone or in any combination thereof.

To attain this, the present invention essentially comprises a welding tip roller guide for supporting a welding tip at a predetermined distance from a corner or other area of a work piece. The guide includes a pair of wheels which allow the device to travel along a corner formed by two adjoining materials. The guide further includes an integral height adjustment mechanism and a pair of guide wheels both to facilitate quick height adjustment of the welding tip and to provide improved lateral stability, respectively.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to .determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new welding tip roller guide apparatus which has many of the advantages of the welding devices mentioned heretofore and many novel features that result in a welding tip roller guide which is not anticipated, rendered obvious, suggested, or even implied by any of the prior art welding devices, either alone or in any combination thereof.

It is another object of the present invention to provide a new welding tip roller guide which may be easily and efficiently manufactured and marketed.

It is a further object of the present invention to provide a new welding tip roller guide which is of a durable and reliable construction.

An even further object of the present invention is to provide a new welding tip roller guide which is susceptible of a low cost of manufacture with regard to both materials and labor, and which accordingly is then susceptible of low prices of sale to the consuming public, thereby making such welding tip roller guides economically available to the buying public.

Still yet another object of the present invention is to provide a new welding tip roller guide which provides in the apparatuses and methods of the prior art some of the advantages thereof, while simultaneously overcoming some of the disadvantages normally associated therewith.

Still another object of the present invention is to provide a new welding tip roller guide which may be utilized for supporting a welding tip at a predetermined distance from a corner or other area of a work piece.

Yet another object of the present invention is to provide a new welding tip roller guide which includes a pair of wheels that allow the roller guide to travel along a corner formed by two adjoining materials.

Even still another object of the present invention is to provide a new welding tip roller guide which includes an integral height adjustment mechanism therein to facilitate an adjustment of a distance defined by the that between a welding tip and a work piece.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
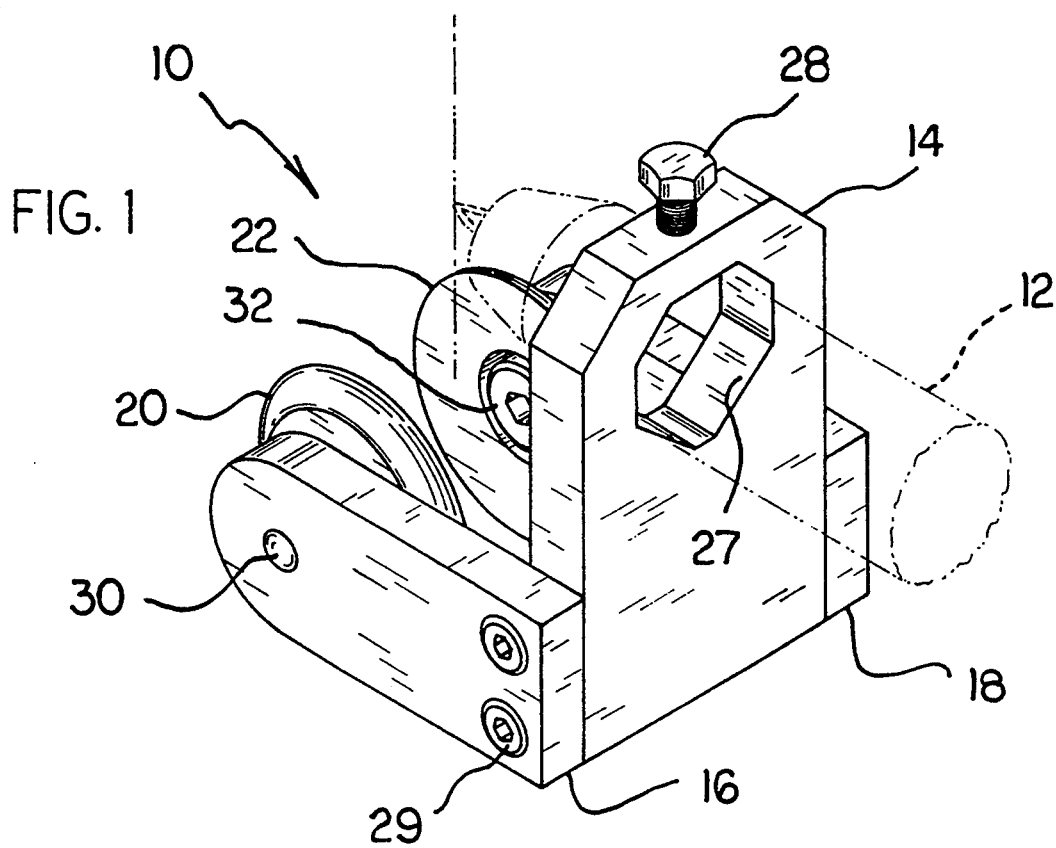
FIG. 1 is a perspective view of a welding tip roller guide comprising the present invention.

With reference now to the drawings, and in particular to FIGS. 1-4 thereof, a new welding tip roller guide embodying the principles and concepts of the present invention and generally designated by the reference numeral 10 will be described.

Figure 2:
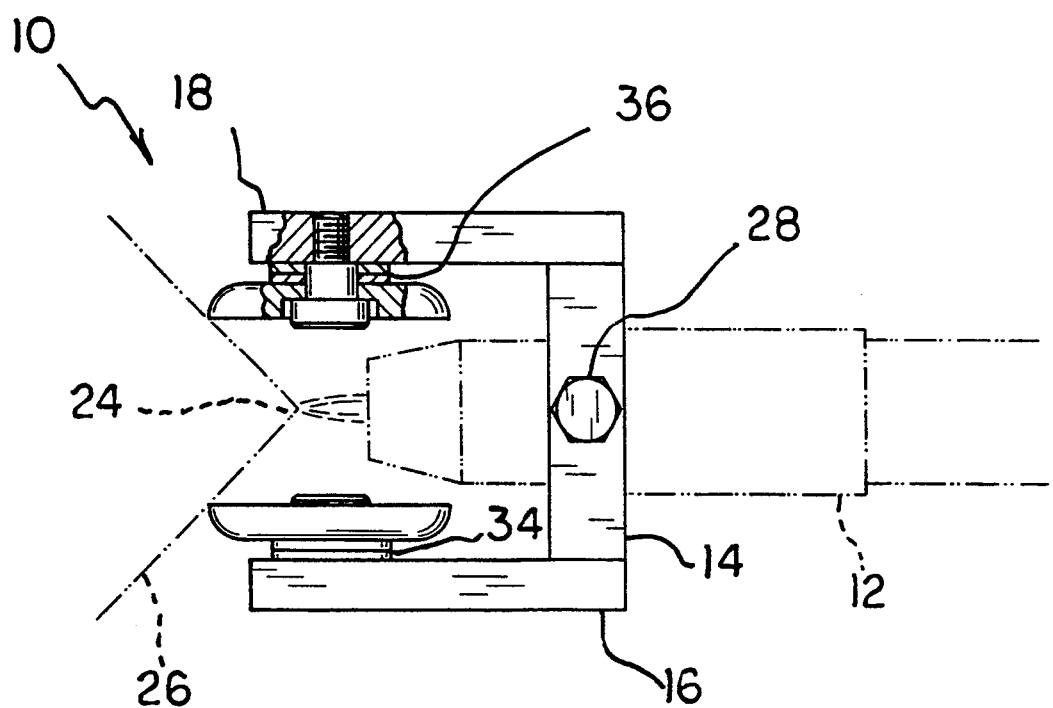
FIG. 2 is a top plan view of the present invention.
Figure 3:
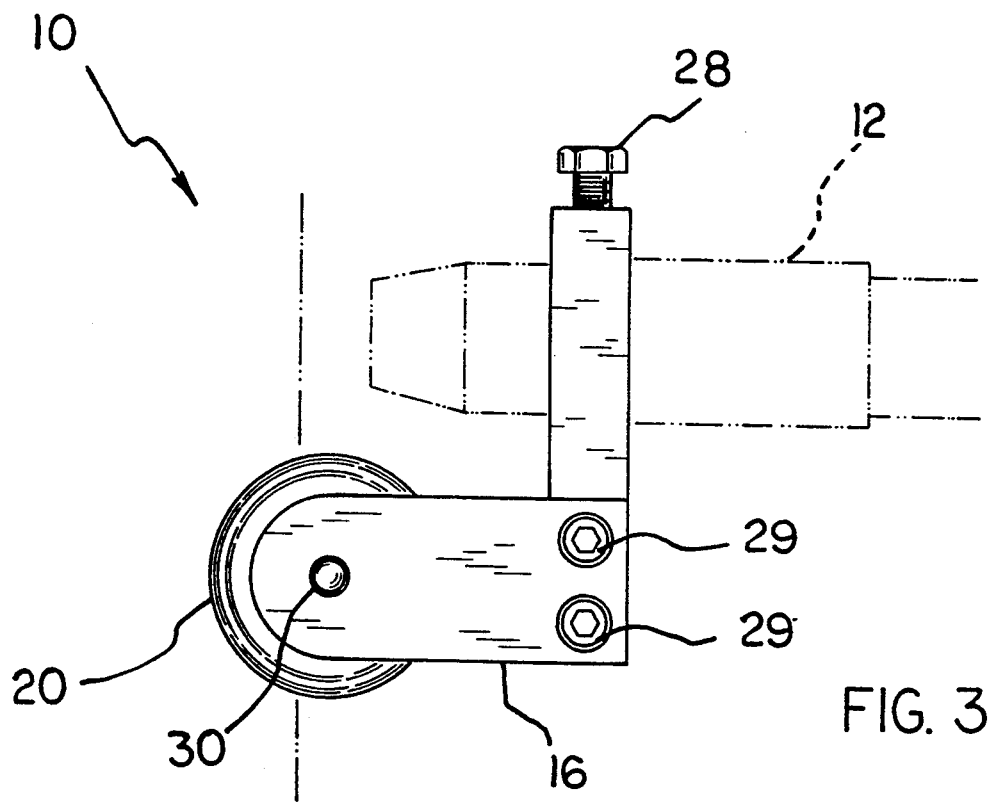
FIG. 3 is a side elevation view of the present invention.
Figure 4:
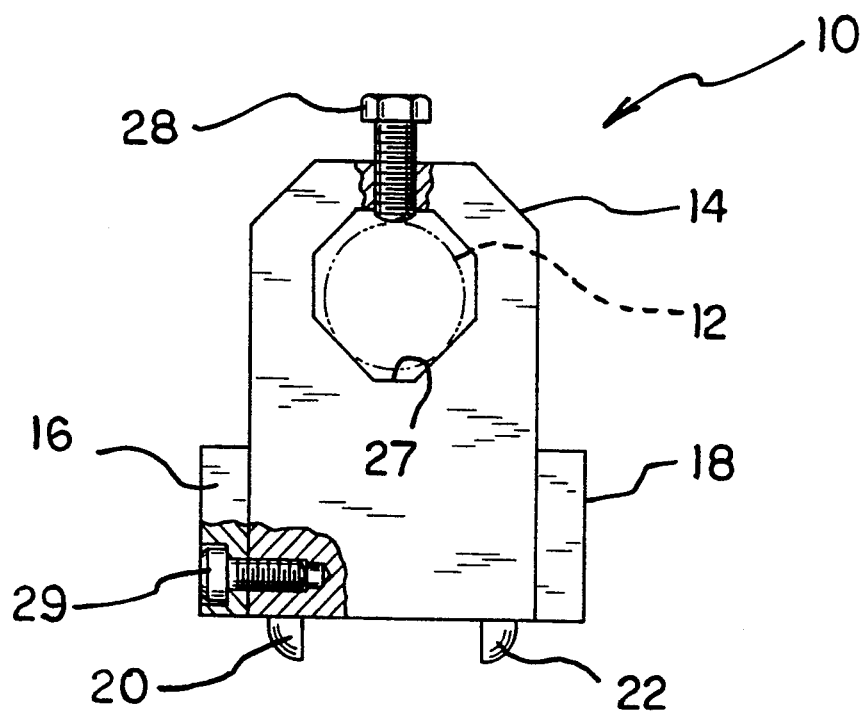
FIG. 4 is a rear elevation view, partially in cross section, of the invention.

The welding tip roller guide 10 is operable to receive and secure thereto a welding tip 12 of any conventional welding device such as arc welders, flame welders, cutting torches, and the like. The welding tip 12 is received within a center member 14 which has a pair of arms 16, 18 projecting away therefrom. A pair of wheels 20, 22 are rotatably supported by the arms 16, 18 such that the center member 14 is positioned at a predetermined distance from a corner 24 of a work piece 26 as best illustrated in FIG. 2. The welding tip roller guide 10 is operable to guide the welding tip 12 along the corner 24 to facilitate an even welding of the work piece 26 by the welding tip. The welding tip roller guide 10 may be used with a cutting torch to facilitate an accurate cutting of a corner 24 of a work piece 26 and may also be used on flat surfaces of the work piece.

More specifically, it will be noted that the welding tip roller guide 10 comprises a center member 14 of substantially rectangular shape having a pair of unlabeled bevel edges at a top end thereof. The center member 14 has a substantially polygonally shaped aperture 27 therein which allows the welding tip 12 to pass therethrough. A securing fastener 28 passes through an aperture in the top end of the center member 14 and into the polygonally shaped aperture 27 to secure the welding tip 12 therein. The center member 14 is operable to receive and secure thereto any type of welding instrument which may be utilized for cutting, welding, and the like.

A pair of arms 16, 18 are fixedly secured to respectively opposed sides of the center member 14 by a plurality of fasteners 29 such that the arms project away from the center member in a plane substantially parallel to the plane defined by the axial length of the welding tip 12. A pair of wheels 20, 22 are rotatably secured to the arms 16, 18 by a pair of axles 30, 32 which pass through the wheels and threadably engage the arms. A plurality of bushings 34, 36 support the wheels 20, 22 away from the arms 16, 18 and allow the wheels to rotate relative thereto. The wheels 20, 22, coupled with respective arms 16, 18, support the center member 14 at a predetermined distance away from the corner 24 of a work piece 26 to be welded by the welding tip 12. The welding tip roller guide 10 is operable to traverse the length of the corner 24 to allow the welding tip 12 to apply a uniform welding bead thereto.

Figure 5:
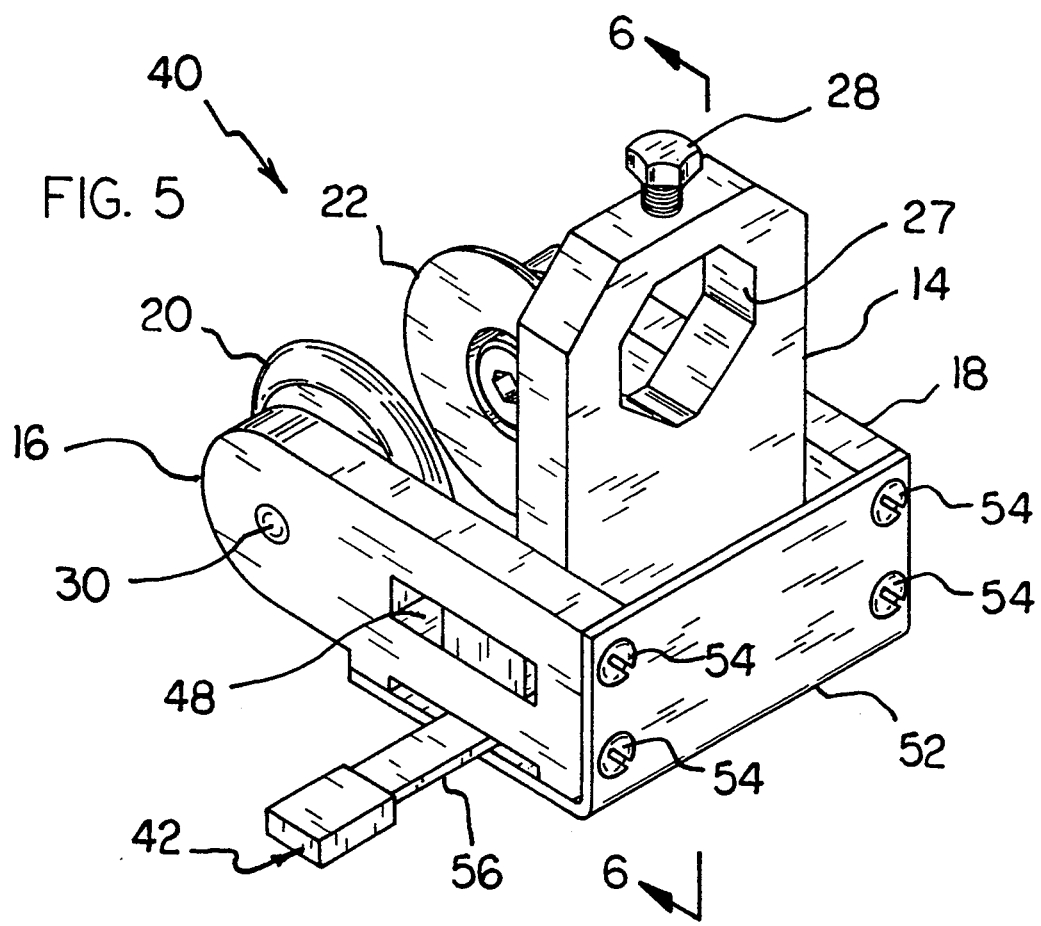
FIG. 5 is a perspective view of second embodiment of the welding tip roller guide.
Figure 6:
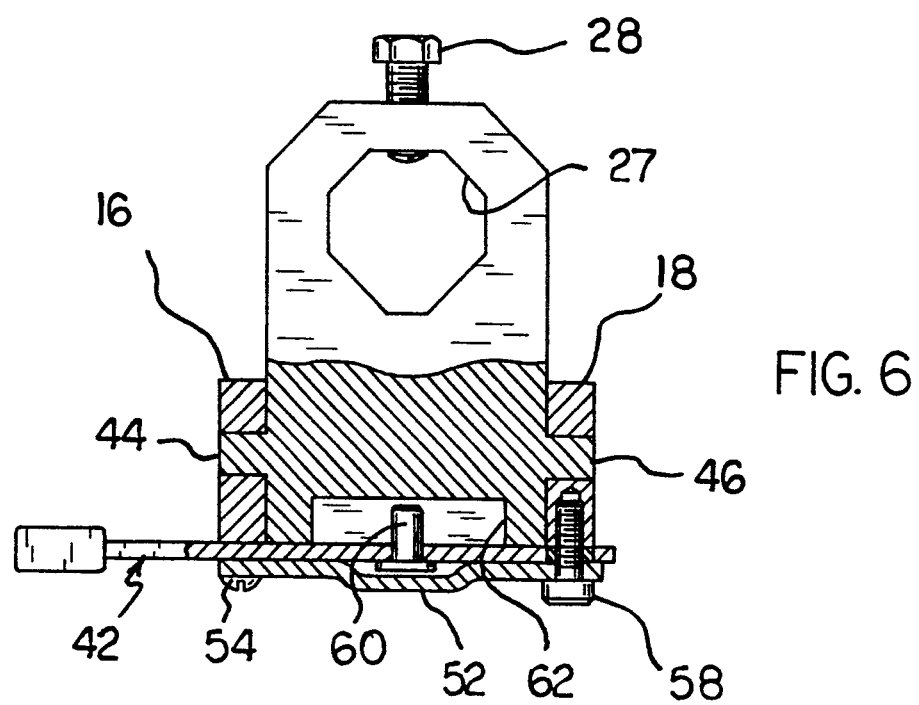
FIG. 6 is a rear elevation view, partially in cross section, of the second embodiment.

A second embodiment of the present invention as generally designated by the reference numeral 40, which comprises substantially all the features of the foregoing embodiment 10 and which further comprises a height adjustment mechanism 42 will now be described. As best shown in FIGS. 5-6, it can be shown that the height adjustment mechanism 42 is operable to selectively move the center member 14 with respect to the arms 16, 18, thereby easily changing the distance between the welding tip 12 and the corner 24 of the work piece 26. The height adjustment mechanism 42 comprises a pair of projections 44, 46 which are integrally or otherwise secured to the center member 14, as best illustrated in FIG. 6. A pair of slots 48, 50 are present in the arms 16, 18 and are operable to receive the projections 44, 46 of the center member 14 and allow a sliding movement relative thereto. A plate 52 is secured to the arms 16, 18 by a plurality of fasteners 54. The plate 52 is operable to support the arms 16, 18 at a predetermined distance apart such that the center member 14 is captured therebetween.

A lever 56 is pivotally supported by a lever fastener 58 upon a bottom area of the arm 18. The lever 56 projects from one of the arms 18 past the other arm 16. A pin 60 is secured to the lever 56 and projects into a journal 62 which is integrally or otherwise formed within a bottom area of the center member 14. The lever 56 is operable to move the center member 14 with respect to the arms 16, 18 and retain a position relative thereto as a result of friction forces developed between the lever, the arm, and the plate 52 by the lever fastener 58. The lever 56 allows a user to change the distance between the welding tip 12 and the work piece 26 in a quick and easy manner.

Figure 7:
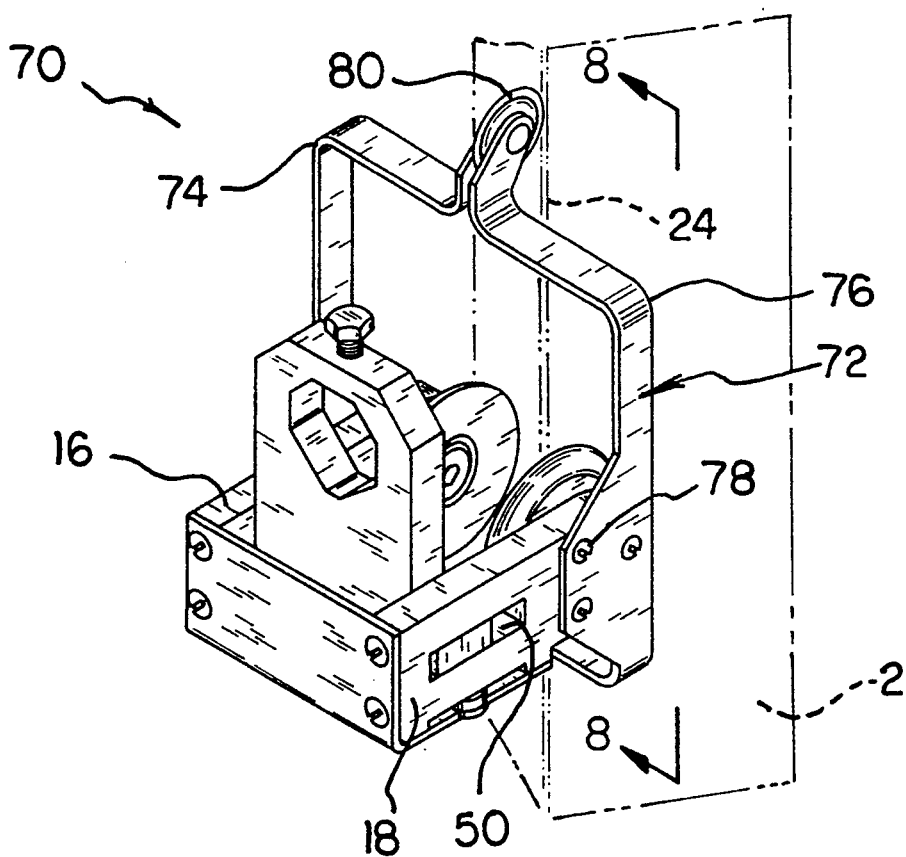
FIG. 7 is a perspective view of a third embodiment of the welding tip roller guide.
Figure 8:
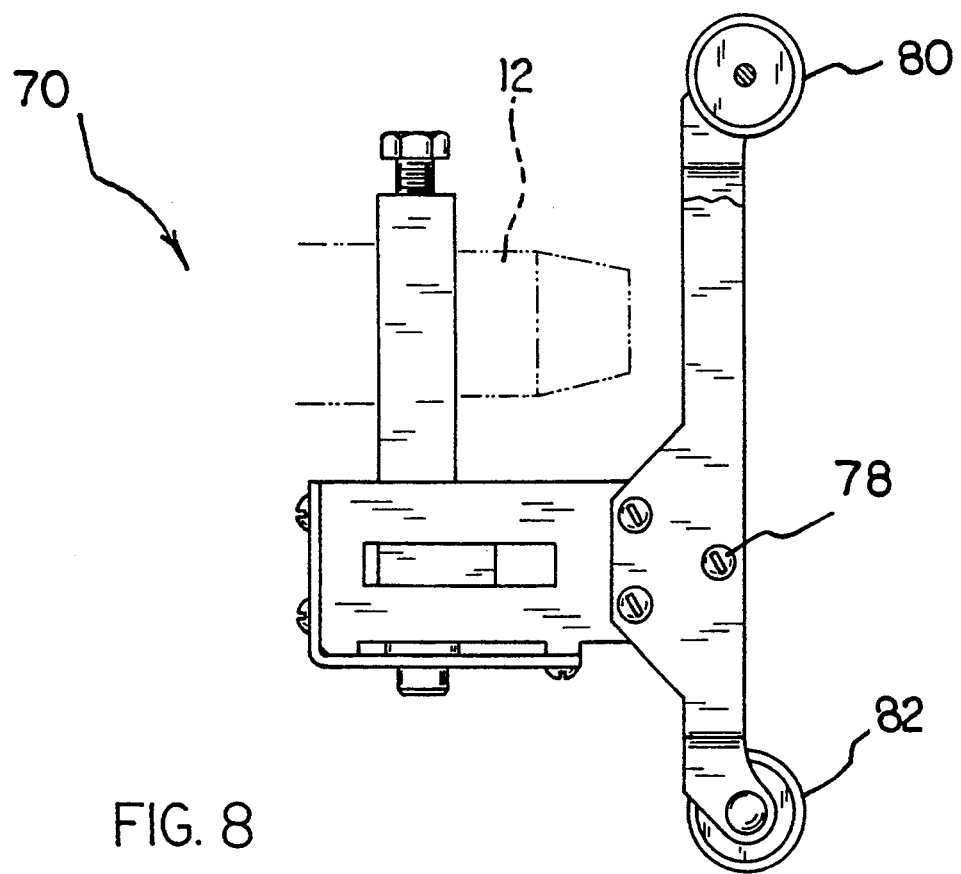
FIG. 8 is a side elevation view of the third embodiment.

Comprising all the features and structure of the previous embodiments 10, 40 is a third embodiment which is generally designated by the reference numeral 70 and may be viewed in FIGS. 7–8. It can be shown that the third embodiment 70 includes a lateral guide 72 which may be utilized to provide lateral guidance to the invention. The lateral guide 72 is comprised of a pair of guide members 74, 76 which are fixedly secured to the arms 16, 18 by a plurality of fasteners 78, as best illustrated in FIG. 7. The guide members 74, 76 extend in a direction both above and below the center member 14 and merge together to support a pair of guide wheels 80, 82 above and below the center member, respectively. The guide wheels 80, 82 are operable to reside partially within the corner 24 of the work piece 26 so as to guide the welding tip roller guide 70 along the work piece. The lateral guide 72 may also be utilized for following a mark along a flat or curved work piece.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A welding tip roller guide comprising:
    a center member releasably attachable to a welding instrument, said center member having both an aperture therethrough operable to receive said welding instrument and a fastener releasably coupled to said center member to selectively secure a position of said welding instrument within said aperture;
    at least one arm movably coupled to said center member and projecting away therefrom;
    at least one wheel rotatably secured to said at least one arm;
    a lever rotatably coupled to said at least one arm and slidably coupled to said center member, whereby said center member may be selectively moved with respect to said at least one arm by a movement of said lever by a user;
    at least one guide member coupled to said at least one arm and extending away therefrom;
    and;
    at least one guide wheel rotatably coupled to said at least one guide member, whereby said at least one guide wheel is substantially aligned with a center of said center member.

2. A welding tip roller guide comprising:
    a center member releasably attachable to a welding instrument, said center member having both an aperture therethrough operable to receive said welding instrument and a fastener releasably coupled to said center member to selectively secure a position of said welding instrument within said aperture;
    a plurality of arms movably coupled to said center member and projecting away therefrom;
    at least one wheel rotatably secured to each of said plurality of arms;
    a plate fixedly secured to said plurality of arms for supporting said plurality of arms a predetermined distance apart;
    a lever rotatably coupled to one of said plurality of arms and slidably coupled to said center member, whereby said center member may be selectively moved with respect to said plurality of arms by a movement of said lever by a user;
    a plurality of guide members each coupled to at least one of said plurality of arms and extending away therefrom;
    and;
    a plurality of guide wheels rotatably coupled to said plurality of guide members, whereby said at plurality of guide wheels are substantially aligned with a center of said center member.

* * * * *